US012631814B2

(12) United States Patent (10) Patent No.: US 12,631,814 B2
Lin (45) Date of Patent: May 19, 2026

(54) LIGHT-GUIDING DEVICE, BACKLIGHT MODULE AND DISPLAY DEVICE HAVING CORNER BRIGHTNESS COMPENSATION STRUCTURES

(71) Applicant: Darwin Precisions Corporation, Hsinchu County (TW)

(72) Inventor: Wen-Huan Lin, Hsinchu County (TW)

(73) Assignee: Darwin Precisions Corporation, Hsinchu County (TW)

( * ) Notice: Subject to any disclaimer, the term of this patent is extended or adjusted under 35 U.S.C. 154(b) by 0 days.

(21) Appl. No.: 18/907,608

(22) Filed: Oct. 7, 2024

(65) Prior Publication Data

US 2025/0123436 A1 Apr. 17, 2025

(51) Int. Cl.
F21V 8/00 (2006.01)
(52) U.S. Cl.
CPC ........... G02B 6/0031 (2013.01); G02B 6/005 (2013.01); G02B 6/0068 (2013.01)
(58) Field of Classification Search
CPC ....... G02B 6/0031; G02B 6/005; G02B 6/068
See application file for complete search history.

(56) References Cited

U.S. PATENT DOCUMENTS

| | | |
|---|---|---|
| 10,191,197 B2 | 1/2019 | Shi |
| 11,086,067 B2 | 8/2021 | Fang et al. |
| 2010/0277949 A1 | 11/2010 | Weng et al. |

| | | | | |
|---|---|---|---|---|
| 2012/0057367 A1* | 3/2012 | Park | ................. | G02F 1/133603 |
| | | | | 362/606 |
| 2012/0120678 A1* | 5/2012 | Su | ......................... | G02B 6/0031 |
| | | | | 362/607 |
| 2012/0134175 A1* | 5/2012 | Kunimasa | ............ | G02B 6/0016 |
| | | | | 362/602 |
| 2015/0055372 A1* | 2/2015 | Wu | ....................... | G02B 6/002 |
| | | | | 362/613 |
| 2015/0131317 A1* | 5/2015 | Yuki | ................... | G02B 6/0073 |
| | | | | 362/610 |

(Continued)

FOREIGN PATENT DOCUMENTS

| | | |
|---|---|---|
| CN | 203309702 U | 11/2013 |
| CN | 106019718 A | 10/2016 |

(Continued)

*Primary Examiner* — Christopher E Dunay
(74) *Attorney, Agent, or Firm* — WPAT, PC

(57) ABSTRACT

A backlight module is disclosed, which includes a light source, a light guide plate, an optical film layer and a light guide device. The light guide plate has a light incident edge and a first side. The light incident edge is configured towards the light source and receives light from the light source. The first side extends along the direction transverse to the light incident edge from one end of the light incident edge. The optical film layer is disposed on the light guide plate. The light guide device is disposed to extend along the first side, and the light guide device has a first portion and a second portion. The first portion faces towards the light source and receives light from the light source. The second portion corresponds to the distant end of the first side that is opposite to the light incident edge and located on the surface of the light guide device opposite to the first portion. The light guide device at least guides the light incident from the light source to the second portion and the light is emitted and reaches the distant end of the first side.

15 Claims, 12 Drawing Sheets

(56)        References Cited

U.S. PATENT DOCUMENTS

| | | | |
|---|---|---|---|
| 2016/0041328 A1* | 2/2016 | Chang .................. | G02B 6/0036 |
| | | | 362/606 |
| 2025/0044492 A1* | 2/2025 | Fattal ................... | G02B 6/0028 |

FOREIGN PATENT DOCUMENTS

| | | | |
|---|---|---|---|
| TW | 201038985 A | 11/2010 |
| WO | WO2020103547 A1 | 5/2020 |

* cited by examiner

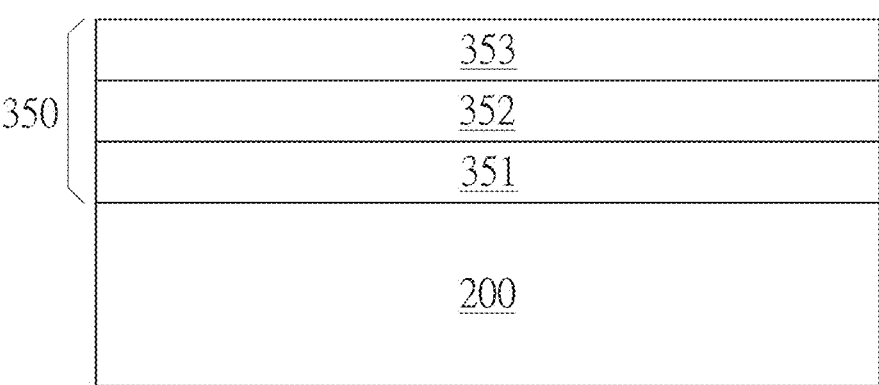
FIG. 1C
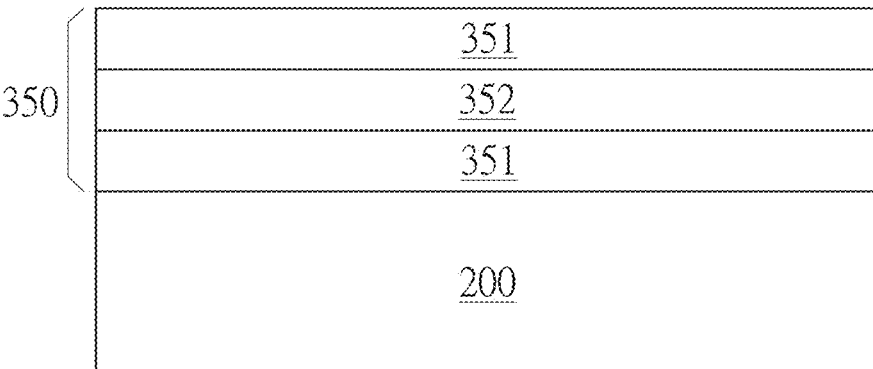
FIG. 1D
FIG. 1E

| device | Conventional architecture | Condition 1 | Condition 2 | Condition 3 |
|---|---|---|---|---|
| Light guide plate (200) | V | V | V | V |
| Light guide device (301/302) | X | V (inclined plane) | V (inclined plane) | V (inclined plane) |
| Width of the light guide device(mm) | X | 1mm | 2mm | 3mm |
| Top corner Relative illumination (%) | 100% | 156.6% | 170.8% | 175% |
| Bottom corner Relative illumination (%) | 100% | 248.6% | 227.6% | 195.1% |
| Uniformity (%) | 37% | 65.5% | 69.2% | 66.6% |

LIGHT-GUIDING DEVICE, BACKLIGHT MODULE AND DISPLAY DEVICE HAVING CORNER BRIGHTNESS COMPENSATION STRUCTURES

CROSS-REFERENCE TO RELATED APPLICATION

This application claims the priority benefits of Taiwan patent application serial no. 112139188 filed on Oct. 13, 2023. The entirety of the aforementioned patent application is hereby incorporated by reference herein and made a part of this specification.

BACKGROUND OF THE INVENTION

1. Field of the Invention

The present invention relates to a backlight module. Particularly, the present invention relates to a backlight module having corner brightness compensation structures.

2. Description of the Prior Art

Generally, brightness at the corners of the two sides (also known as the top side and the bottom side) of a light guide plate of a backlight module is lower than other locations on the light guide plate. Such corners are commonly known as dark corners. Especially for injection-molded light guide plates, the corner dots of both sides of the glue gate have low light transcription rate, further exacerbating the dimming at the corners of the light guide plate.

Currently, vehicle-mounted backlight modules gradually incorporate charge-coupled device (CCD) in full scanning specifications. Generally, the measurement range of full scanning specifications will be quite close to the corners of the screen. Whether the brightness of the corners can be enhanced are technical problems to be solved to improve the uniformity of charge-coupled device.

SUMMARY OF THE INVENTION

In order to solve the above problems, an embodiment of the present invention provides a backlight module containing a light source, a light guide plate, an optical film layer and a light guide device. The light guide plate has a light incident edge and a first side. The light incident edge is configured facing the light source and receiving the light from the light source. The first side extends along the direction transverse to the light incident edge from one end of the light incident edge. The optical film layer is disposed on the light guide plate. The light guide device is disposed to extend along the first side, and the light guide device has a first portion and a second portion. The first portion faces towards the light source and receives light from the light source. The second portion corresponds to the distant end of the first side that is opposite to the light incident edge and located on a surface of the light guide device opposite to the first portion. The light guide device at least guides the light incident from the light source to the second portion and the light is emitted and reaches the distant end of the first side.

An embodiment of the present invention also provides a light guide device containing a body, a first portion and a second portion. The body extends along one side of a light guide plate. The first portion is connected to the body and disposed towards a light source and receives light from the light source. The second portion is connected to the body and disposed on the distant end of the body opposite to the first portion. The light incident on the first portion from the light source emits from the light guide device via the body and the second portion, and the light is incident on the corner of the light guide plate.

An embodiment of the present invention also provides a display device containing the aforementioned backlight module and a display panel disposed on the light emitting side of the backlight module.

Technical Effects with Respect to Prior Art

According to the backlight module and the display device provided by an embodiment of the present invention, the light incident from the light source can be guided to the first portion and the second portion by the light guide device and emitted to the two ends of the first side of the light guide plate. Therefore, the brightness of the corners of the two sides of the backlight module can be enhanced, and the uniformity of the charge-coupled device can be improved.

BRIEF DESCRIPTION OF THE DRAWINGS

In order to make the above-mentioned and other purposes, features, advantages and embodiments of the present invention more clearly understood, the accompanying drawings are described as follows:

FIG. 1C to FIG. 1E are schematic side views of different configurations of the optical film layer according to an embodiment of the present invention.

FIG. 7 is a schematic table showing the simulation results of the illuminance of the corners of a backlight module according to an embodiment of the present invention.

FIG. 9 is a schematic side view of a display device containing a backlight module according to an embodiment of the present invention.

DETAILED DESCRIPTION OF THE PREFERRED EMBODIMENT

Figure 1A:
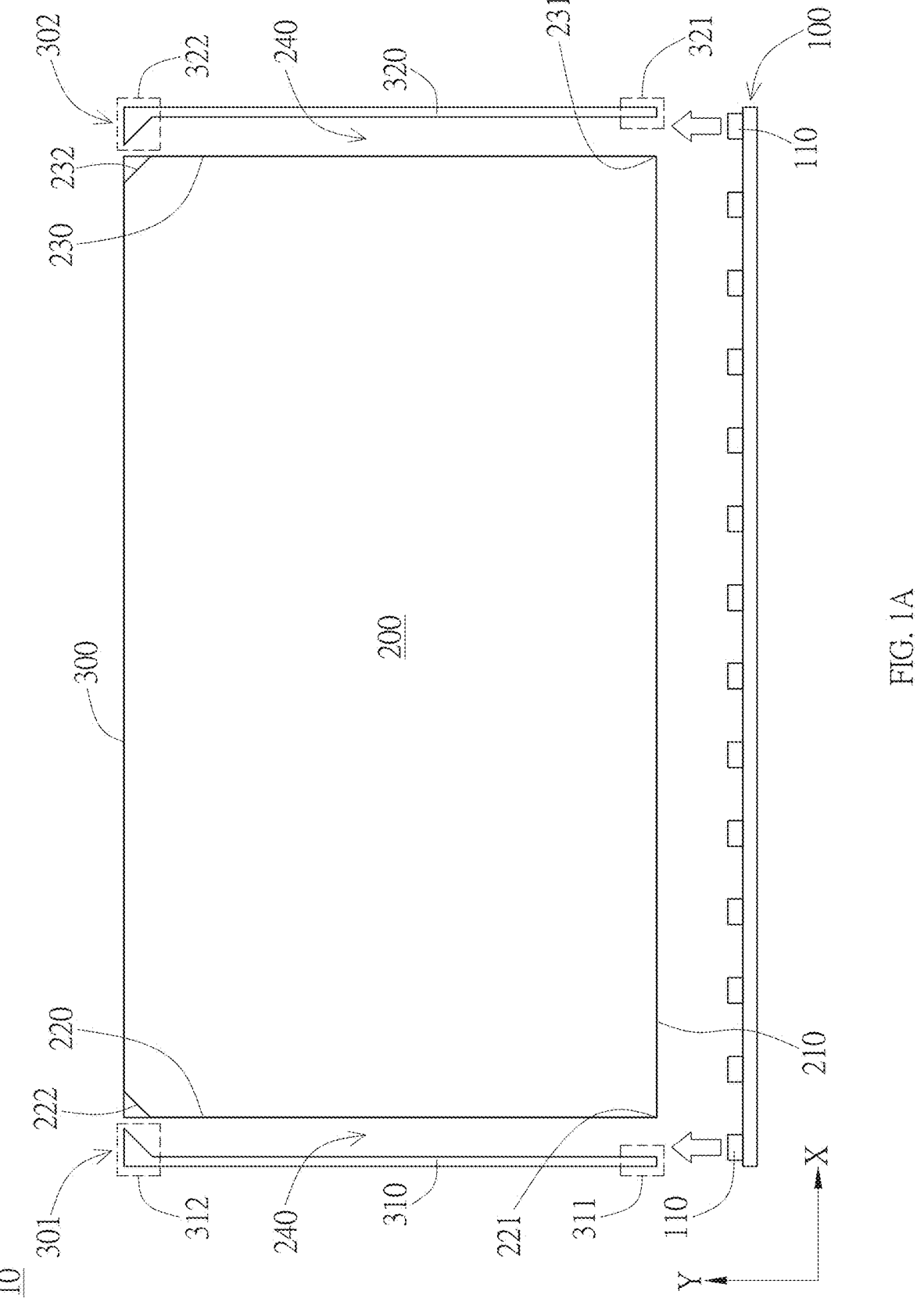
FIG. 1A is a schematic front view of a backlight module according to an embodiment of the present invention.

Various embodiments will be described in the specification, and a person having ordinary skill in the art can easily understand the spirit and the principles of the present invention by referencing the specification and the drawings. Each element or part shown in each drawing may be exaggerated or changed for clarity. Therefore, a person having ordinary skill in the art should understand that the size and relative ratio of each element or part shown in the drawings are not the actual size and relative ratio of the actual element or part. Additionally, although some specific embodiments have been described in detail herein, these embodiments are intended to be illustrative only and are not to be considered in a limiting or exhaustive sense in all respects. Therefore, various changes and modifications to the present invention should be apparent to and can be easily accomplished by a person having ordinary skilled in the art without departing from the spirit and principles of the present invention.

Refer to FIG. 1A. A schematic front view of a backlight module according to an embodiment of the present invention is illustrated. As shown in the FIG. 1A, the backlight module 10 provided by an embodiment of the present invention has a light source 100, a light guide plate 200, an optical film layer 300 and a light guide device 301. The light guide plate 200 has a light incident edge 210 and a first side 220. The light incident edge 210 is configured toward the light source 100 and receive light from the light source 100. In other words, the light incident edge 210 is the side of the light guide plate 200 close to the light source 100. The first side 220 of the light guide plate 200 extends along the direction transverse to the light incident edge 210 from one end of the light incident edge 210. In other words, the light incident edge 210 of the light guide plate 200 can extend along the direction parallel to the X-axis as shown in the FIG. 1A, and a first side of the light guide plate 200 can be a side of the light guide plate 200 adjacent to the light incident edge 210, such as the first side 220 located on the left side of the light guide plate 200, or the first side 230 located on the right side of the light guide plate 200. In addition, a first side can extend along the direction perpendicular to the light incident edge 210, that is, the direction parallel to the Y-axis. The optical film layer 300 is disposed on the light guide plate 200.

A light guide device of the backlight module 10 can be disposed to extent along the direction of a first side, that is, the direction parallel to the Y-axis in FIG. 1, for example, the light guide device 301 adjacent to the left side of the light guide plate 200, or the light guide device 302 adjacent to the right side of the light guide plate 200. The light guide device 301 has a body 310, a first portion 311 and a second portion 312. The light guide device 302 has a body 320, a first portion 321 and a second portion 322. The body 310 extends along the direction parallel to the first side 220 on the left side of the light guide plate 200, and the body 320 extends along the direction parallel to the first side 230 on the right side of the light guide plate 200. The first portion 311 and the first portion 321 face the light source 100 and receive light from the light source 100. That is, the location of the first portion 311 is adjacent to a near end 221 of the first side 220 of the light guide plate 200, and the location of the first portion 321 is adjacent to a near end 231 of the first side 230 of the light guide plate 200. The second portion 312 and the second portion 322 are located on the side away from the light incident edge 210 of the light guide plate 200. In other words, the second portion 312 corresponds to a distant end 222 of the first side 220 that is opposite to the light incident edge 210 of the light guide plate 200, and the second portion 322 corresponds to a distant end 232 of the first side 230 that is opposite to the light incident edge 210 of the light guide plate 200, as shown in FIG. 1A.

Figure 1B:
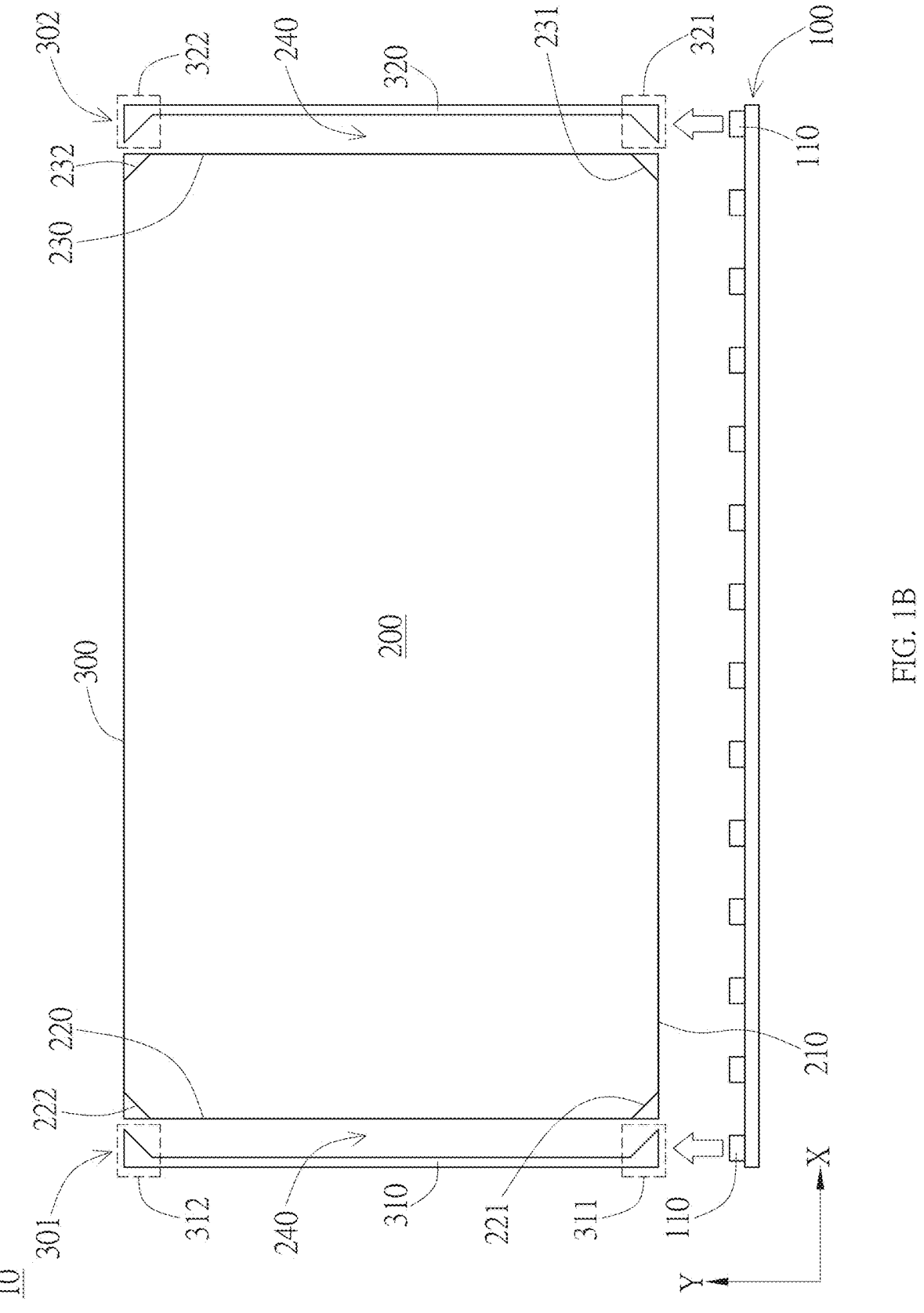
FIG. 1B is a schematic front view of a backlight module according to another embodiment of the present invention.

Refer to FIG. 1B, which is a schematic front view of the backlight module according to another embodiment of the present invention. The configurations of the backlight module 10, the light source 100, the light guide plate 200, the optical film layer 300, the light guide device 301 and the light guide device 302 of the embodiment are the same as the embodiment of FIG. 1A, and the configurations will not be described again here. The differences between the embodiments of FIG. 1A and FIG. 1B will be described as follows. In FIG. 1A, the first portion 311 of the light guide device 301 has a rectangular shape. After the light emitted from the light source 100 enters the light guide device 301, very little light can travel to the light guide plate 200 from the first portion 311. The light will only travel to the light guide plate 200 from the side away from the light incident edge 210. That is, the light will travel to the light guide plate 200 from the second portion 312. In FIG. 1B, after the light emitted from the light source 100 enters the light guide device 301, the light can travel to the light guide plate 200 from the first portion 321 and the second portion 322. Since the light guide device 302 on the right side of the light guide plate 200 is similar to the light guide device 301 on the left side of the light guide plate 200, the same process occurs at the light guide device 302 and will not be described again here. The detail descriptions of the first portion 321 and the second portion 322 will be described below.

Refer to FIG. 1C to FIG. 1E, which are schematic side views of different configurations of the optical film layer according to an embodiment of the present invention. The specific structures of the aforementioned optical film layer 300 disposed on the light guide plate 200 can be implemented as various combinations of a diffuser film, a light collecting sheet and a polarizer. For example, the optical film layer 300 can be composed of a diffuser film 351, a light collecting sheet 352 and a reflective polarizing brightness enhancement film 353 sequentially stacked on the light guide plate 200, as shown in FIG. 1C. Alternatively, the optical film layer 300 can be composed of only the diffuser film 351 and the light collecting sheet 352 stacked on the light guide plate 200, as shown in FIG. 1D. Alternatively, the optical film layer 300 can be composed of the diffuser film 351 and the light collecting sheet 352 alternatively stacked on the light guide plate 200, as shown in FIG. 1E. It should be noted that the quantity of the diffuser film 351, the light collecting sheet and the reflective polarizing brightness enhancement film 353 included in the optical film layer 300 is merely an example and not a limitation.

Figure 2A:
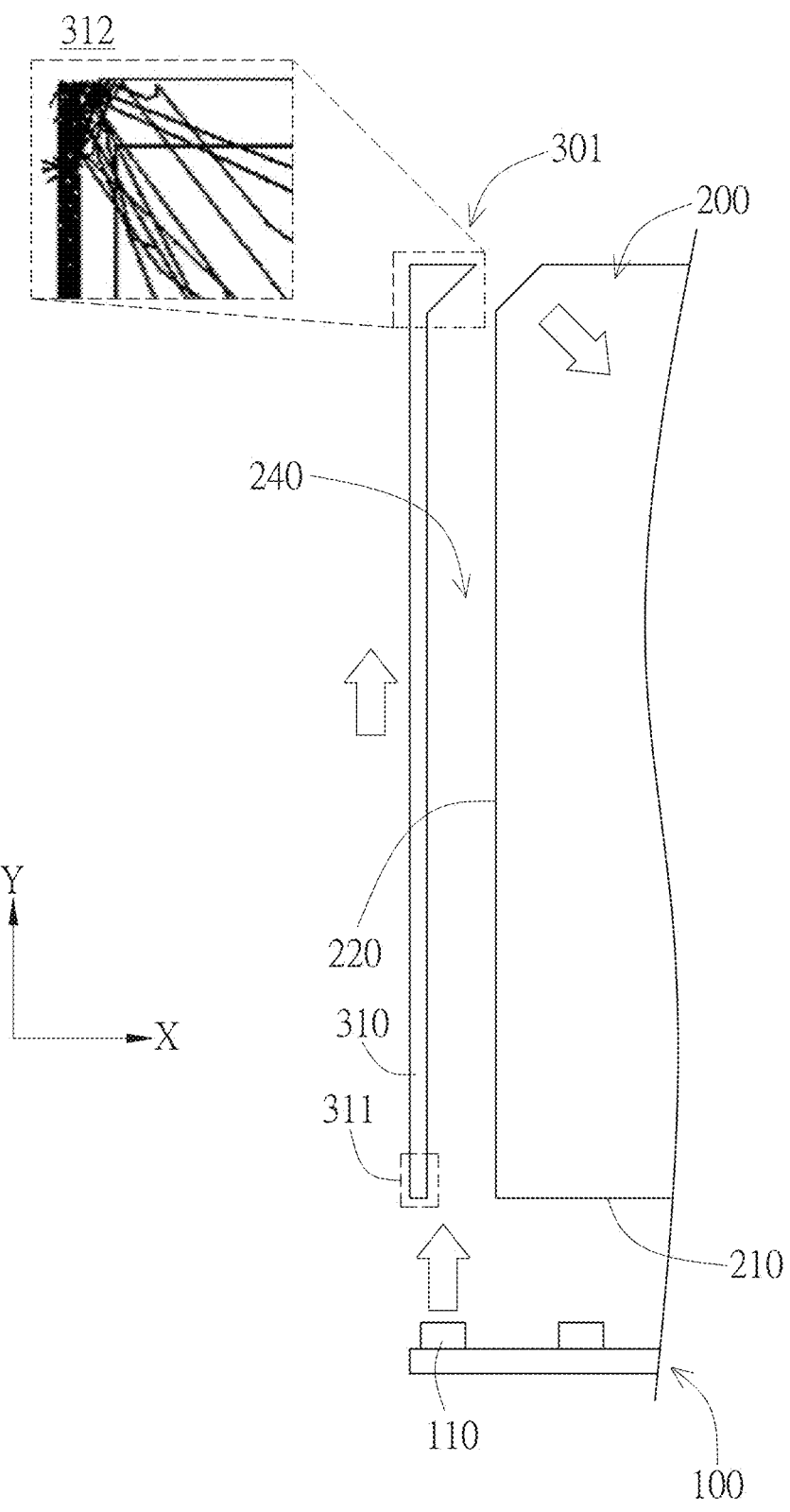
FIG. 2A is a light trace simulation front view of the second portion of the left light guide device according to an embodiment of the present invention.
Figure 2B:
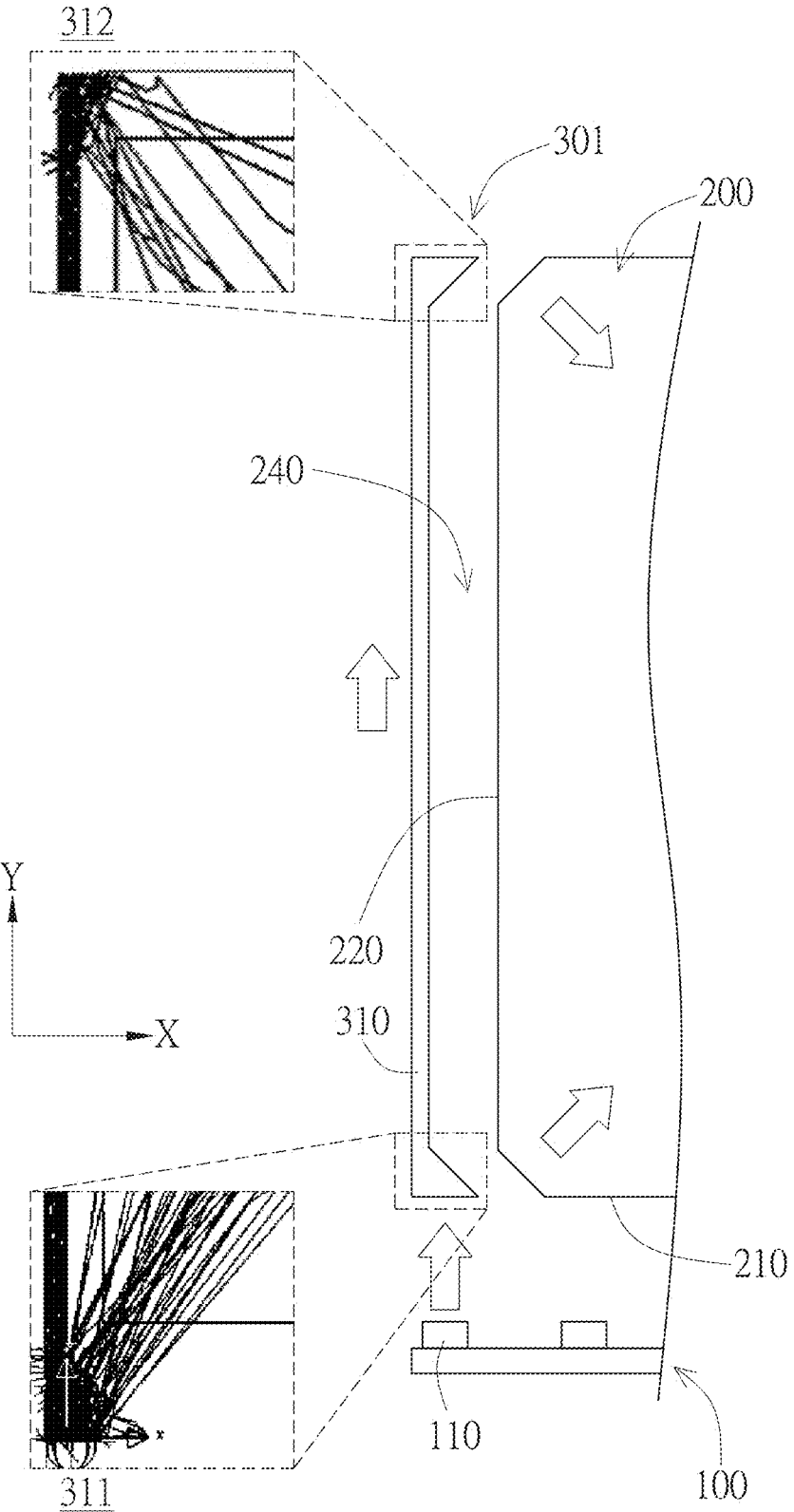
FIG. 2B is a light trace simulation front view of the first portion and the second portion of the left light guide device according to an embodiment of the present invention.

Refer to FIG. 2A and FIG. 2B, wherein FIG. 2A is a light trace simulation front view of the second portion of the left light guide device according to an embodiment of the present invention and FIG. 2B is a light trace simulation front view of the first portion and the second portion of the left light guide device according to an embodiment of the present invention. In FIG. 2A, after the light guide device 301 of the backlight module 10 receives the light emitted from the light source 100, the light will be guided to the second portion 312 along the direction in which the body 310 of the light guide device 301 extends, and then the light will travel to the corner of the first side 220 of the light guide plate 200 away from the light source, as shown in the light trace simulation in FIG. 2A. Furthermore, in FIG. 2B, after the light guide device 301 of the backlight module 10 receives the light emitted from the light source 100, the light will be guided to the second portion 312 along the direction in which the body 310 of the light guide device 301 extends, and then the light will travel to the corner of the first side 220 of the light guide plate 200 away from the light source 100. Alternatively, the light may be transmitted from the first portion 311 to the corner of the first side 220 of the light guide plate 200 adjacent to the light source 100, as shown in the light trace simulation in FIG. 2B. The corner brightness of the two sides of the light guide plate 200 of the backlight module 10 can be effectively enhanced according to the light guide device 301 and the light guide device 302 of the backlight module 10.

Regarding the above configurations of the light source 100, the light source 100 can be disposed to extend along the direction of the light incident edge 210 of the light guide plate 200. That is, the light source 100 can be disposed along the direction of X-axis, as shown in FIG. 1A. Moreover, the light source 100 extends at least partially to the left outside the light incident edge 210 of the light guide plate 200, and faces the first portion 311 of the light guide device 301. Alternatively, the light source 100 may extend to the right outside the light incident edge 210 of the light guide plate 200, and faces the first portion 321 of the light guide device 302. Specifically, the light source 100 can be implemented as a light bar containing a plurality of light-emitting diode 110. For example, the light source 100 can be implemented as a plurality of micro-organic light-emitting diodes (micro-OLED) or a plurality of micro light-emitting diodes (micro-LED). The plurality of light-emitting diodes 110 can be arranged along the direction parallel to the light incident edge 210 of the light guide plate 200, and at least one of the light-emitting diodes is configured to face the first portion 311 of the light guide device 301. Alternatively, at least one light-emitting diode 110 may be configured to face the first portion 321 of the light guide device 302, as shown in FIG. 1A and FIG. 1B.

In order to effectively enhance the brightness of the corners of both sides of the light guide plate 200, the light guide device 301 and the light guide device 302 may be not in direct contact with the light guide plate 200. Alternatively, an air layer 240 may be disposed between the light guide device 301 (or the light guide device 302) and the light guide plate 200. Since the refractive index of air is generally lower than that of glass materials such as the light guide plate, the light guide device 301, and the light guide device 302, when the light emitted from the light-emitting diode enters the light guide device 301 or the light guide device 302, the light will be totally reflected more easily on the interface between the light guide device 301 (or the light guide device 302) and the air layer 240. In other words, when the light propagates from the first portion 311 of the light guide device 301 to the second portion 312, the light is less likely to leak outside the light guide device 301. Similarly, when the light propagates from the first portion 321 of the light guide device 302 to the second portion 322, the light is less likely to leak outside the light guide device 302, as shown in FIG. 2A and FIG. 2B.

Figures 3A, 3B, 3C:
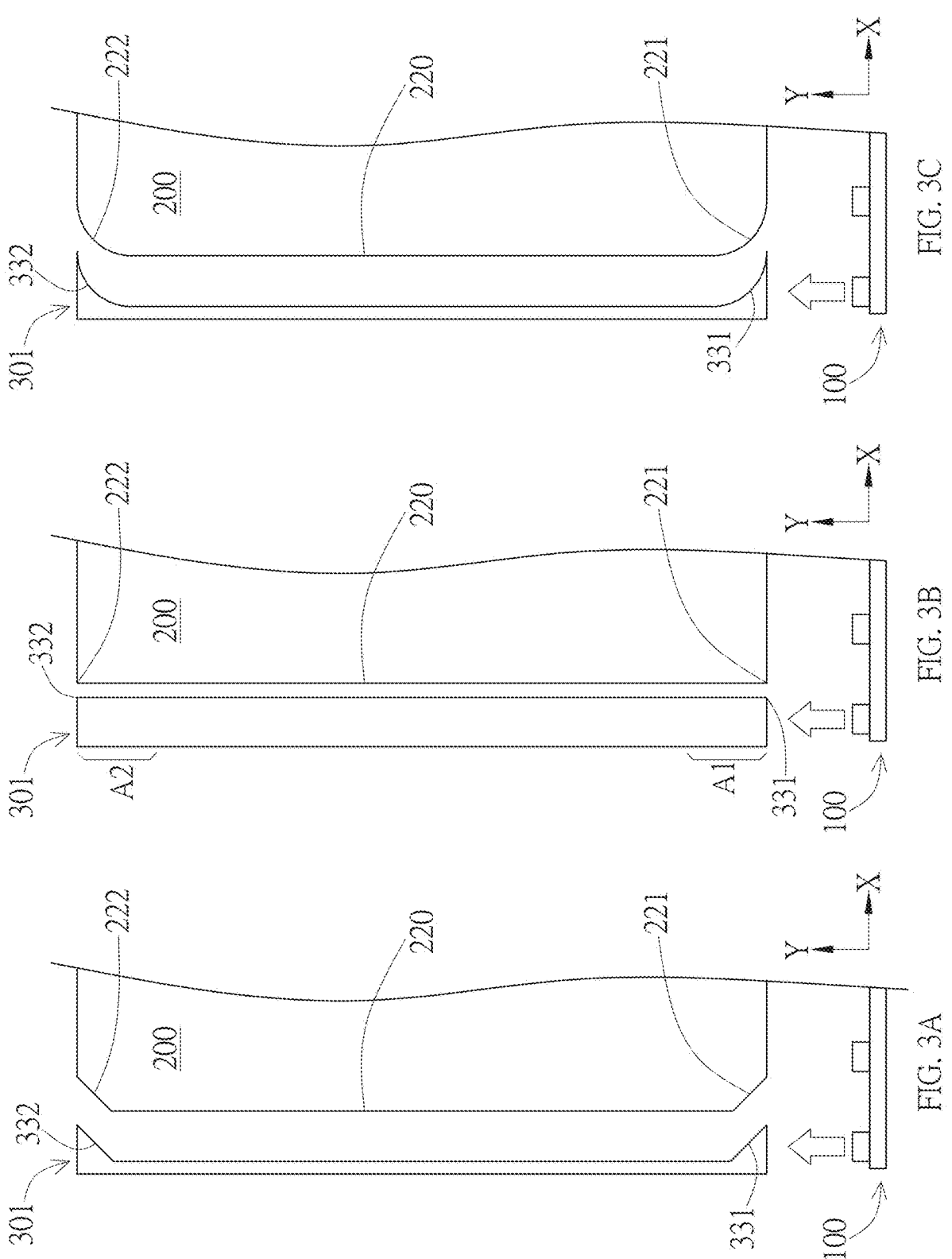
FIG. 3A to FIG. 3C are schematic front views of the light emitting surface of a light guide device according to an embodiment of the present invention.

Refer to FIG. 3A to FIG. 3C, which are schematic front views of the light emitting surface of the light guide device according to an embodiment of the present invention. In order to enhance the brightness of both sides of the light guide plate 200, the first portion 311 of the light guide device 301 on the left side of the light guide plate 200 can be implemented as a first light emitting surface 331 facing the first side 220 of the light guide plate 200. Furthermore, the shape of the first light emitting surface 331 can be implemented such that the end of the first light emitting surface 331 adjacent to the light source 100 is near the light guide plate 200, and the other end of the first light emitting surface 331 away from the light source 100 is far from the light guide plate 200. In other words, the first light emitting surface can be an inclined surface, as shown in FIG. 3A. In addition, the first light emitting surface 331 of the light guide device 301 can be implemented in various shapes. For example, the first light emitting surface 331 can be an inclined surface as in FIG. 3A, or a plane with right angle at the turning point as in FIG. 3B, or a curved surface as in FIG. 3C.

Similarly, the second portion 312 of the light guide device 301 on the left side of the light guide plate 200 can be implemented as a second light emitting surface facing the first side 220 of the light guide plate 200. Furthermore, the shape of the second light emitting surface 332 can be implemented such that the end of the second light emitting surface 332 away from the light source 100 is near the light guide plate 200, and the other end of the second light emitting surface 332 near the light source 100 is far from the light guide plate 200, as shown in FIG. 3A. The second light emitting surface 332 of the light guide device 301 can be implemented in various shapes like the first light emitting surface 331. For example, the second light emitting surface 332 can be an inclined surface as in FIG. 3A, or a plane with right angle at the turning point as in FIG. 3B, or a curved surface as in FIG. 3C. Accordingly, the light guide device 302 on the right side of the light guide plate 200 has similar configurations to the light guide device 301 on the left side of the light guide plate 200, and it will not be described again here.

In FIG. 3A and FIG. 3C, the first light emitting surface 331 and the second light emitting surface 332 are configured as an inclined surface or a curved surface. When light propagates to the first portion 311 and the second portion 312, the light will be incident on the first light emitting surface 331 and the second light emitting surface 332 in different angles, thereby increasing the probability of the light travelling to the corners of the light guide plate 200. In FIG. 3B, since the light guide device 301 is generally in a strip shape, the first light emitting surface 331 and the second light emitting surface 332 are configured to be planes. When light propagates to the first portion and the second portion in the light guide device, the incident angle variation on the first light emitting surface 331 and the second light emitting surface is smaller than that in FIG. 3A and FIG. 3C. Therefore, in FIG. 3B, a microstructure region A1 can be disposed on the surface of the first portion 311 away from the first side 220 of the light guide plate 200, and a microstructure region A2 can be disposed on the surface of the second portion 312 away from the first side 220 of the light guide plate 200. When light propagates to the regions of the first portion 311 and the second portion 312 in the light guide device, the light will travel from the microstructures A1 and the microstructures A2 in different angles, and then the light will be incident to the first light emitting surface 331 and the second light emitting surface 332, thereby increasing the probability of the light travelling to the corners of the light guide plate 200.

In addition, in one embodiment, the shape of the first side 220 on the left side of the light guide plate 200 can be matched with different shapes of the light guide device 301. The shapes could be complementary to each other, but not limited thereto. Specifically, the shape of the near end 221 of the first side 220 on the left side of the light guide plate 200 connecting the light incident edge 210 can have the same shape as the first light emitting surface 331 of the light guide device 301. For example, the shape of the near end 221 of the first side 220 on the left side of the light guide plate 200 and the shape of the first light emitting surface 331 of the light guide device 301 can be inclined planes of the same inclination angle, as shown in FIG. 3A. Alternatively, the shape of the near end 221 and the first light emitting surface 331 can be planes with right angle at the turning point, as shown in FIG. 3B. Alternatively, the shape of the near end 221 and the first light emitting surface 331 can be curved surfaces with the same curvature, as shown in FIG. 3C.

Similarly, the distant end 222 of the first side 220 on the left side of the light guide plate 200 can be matched with different shapes of the second light emitting surface 332. For example, the shapes of the distant end 222 and the second light emitting surface 332 can be inclined planes with the same inclination angle as shown in FIG. 3A, or planes with right angle at the turning point as shown in FIG. 3B, or curved surfaces with the same curvature as shown in FIG. 3C. In the same way, the shape configuration of the near end and the distant end of the first side on the right side of the light guide plate 200 and the first light emitting surface and the second light emitting surface of the light guide device on the right hand side is similar to the shape configuration of the near end 221 and the distant end 222 of the first side 220 on the left side of the light guide plate 200 and the first light emitting surface 331 and the second light emitting surface 332 of the light guide device 301, and it will not be described again here.

Figure 4:
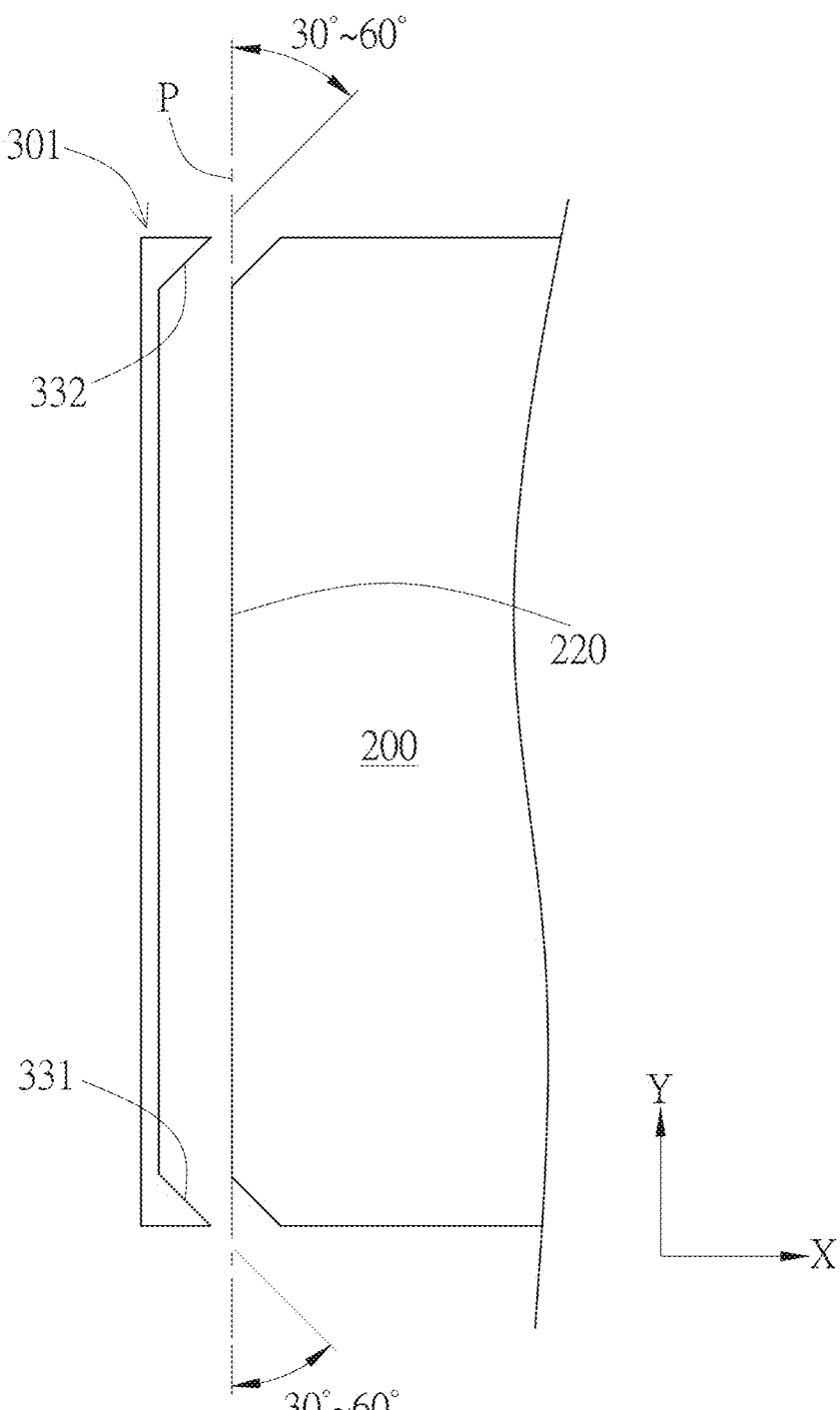
FIG. 4 is a schematic front view of the angle range of the light emitting surface of a light guide device according to an embodiment of the present invention.

Refer to FIG. 4, which is a schematic front view of the angle range of the light emitting surface of the light guide device according to an embodiment of the present invention. As shown in FIG. 4, in order to enhance the brightness of the corners of the two sides of the light guide plate 200, when the first light emitting surface 331 of the light guide device 301 on the left side of the light guide plate 200 is an inclined plane, the inclined plane can be configured to different inclined angles to achieve better effect. For example, the angle between an extending direction of the first light emitting surface 331 and an extended virtual plane of the first side 220 of the light guide plate 200 can range from 30 degrees to 60 degrees such that the light has a higher probability to reach the corner of the light guide plate 200 when the light is transmitted from the first light emitting surface 331.

Similarly, when the second light emitting surface 332 of the light guide device 301 on the left side of the light guide plate 200 is an inclined plane, the inclined plane is configured to different inclined angles to achieve better effect. For example, the angle between an extending direction of the second light emitting surface 332 and an extended virtual plane of the first side 220 of the light guide plate 200 can range from 30 degrees to 60 degrees. In the same way, the angle configuration of the first light emitting surface and the second light emitting surface of the light guide device on the right side of the light guide plate 200 is similar to the angle configurations of the first light emitting surface 331 and the second light emitting surface 332 of the light guide device 301 on the left side of the light guide plate 200, and it will not be described again here. Furthermore, if the first light emitting surface 331 and the second light emitting surface 332 are curved surfaces, the first light emitting surface 331 and the second light emitting surface 332 can respectively define a tangent plane passing through the center point as an extended direction. The angle between the extended direction and the extended virtual plane of the first side 220 of the light guide plate 200 can also range from 30 degrees to 60 degrees (not shown in figures).

Figure 5:
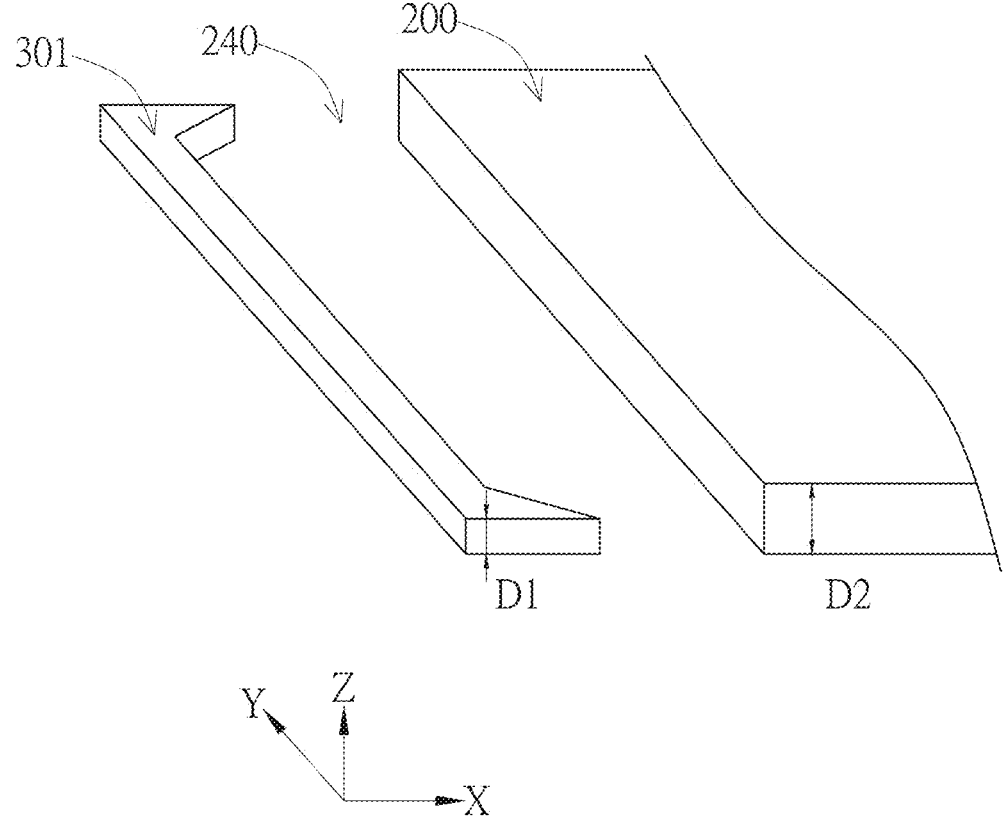
FIG. 5 is a schematic diagram of the thickness of a light guide device and a light guide plate according to an embodiment of the present invention.

Refer to FIG. 5, which is a schematic diagram of the thickness of the light guide device and the light guide plate according to an embodiment of the present invention. As shown in FIG. 5, considering the effect of the whole light guide device 301 on increasing the brightness of the corners of the light guide plate 200, when the thickness D1 of the light guide device 301 is configured to be less than or equal to the thickness D2 of the light guide plate 200, light transmitted from the light guide device 301 is more likely to reach the corners of the light guide plate 200, that is, the improvement efficiency is better. If the thickness D1 of the light guide device 301 is configured to be greater than the thickness D2 of the light guide plate 200 and the rest of the conditions remain unchanged, some light will escape after being transmitted from the light guide device 301. Therefore, less light will reach the light guide plate 200, and the improvement efficiency is worse. In the same way, thickness configuration of light guide device on the right side of the light guide plate 200 is similar to that of the light guide device 301, and it will not be described again here.

Figure 6A:
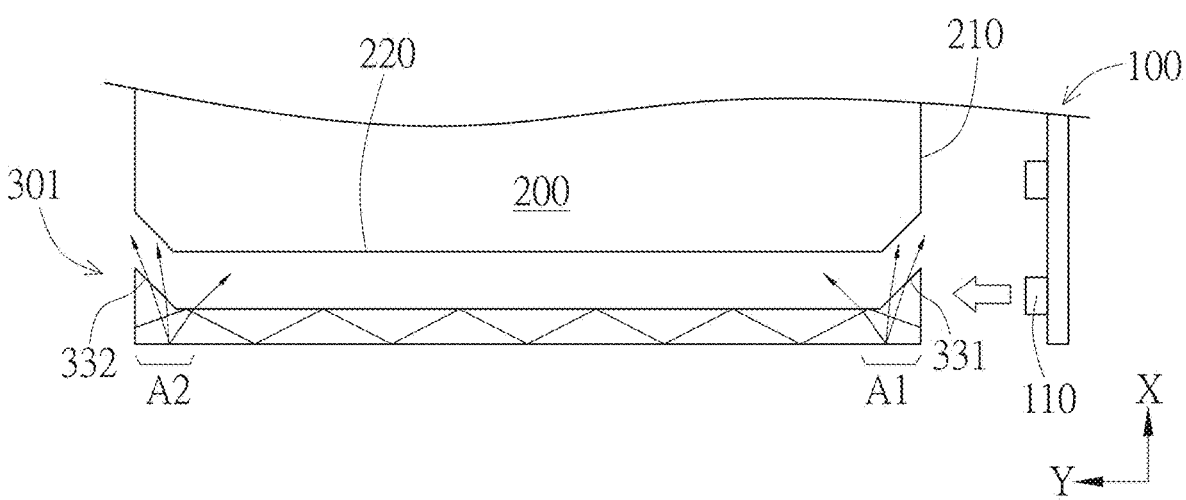
FIG. 6A is a schematic diagram of the microstructure region of a light guide device according to an embodiment of the present invention.
Figure 6B:
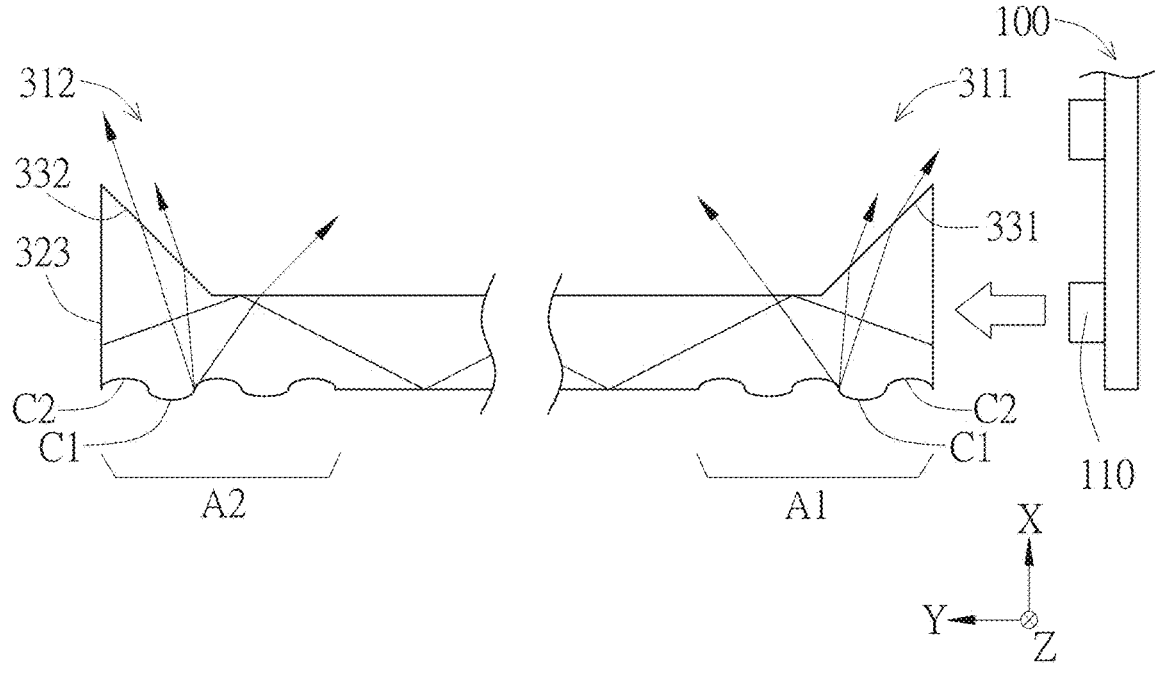
FIG. 6B is an enlarged schematic diagram of the microstructure region of a light guide device according to an embodiment of the present invention.

In addition to adjusting the thickness configurations of the light guide device to achieve the effect of increasing the brightness of the corners of the light guide plate 200, there are other ways of implementation. Refer to FIG. 6A and FIG. 6B, wherein FIG. 6A is a schematic diagram of the microstructure region of the light guide device according to an embodiment of the present invention and FIG. 6B is an enlarged schematic diagram of the microstructure region of the light guide device according to an embodiment of the present invention. As shown in FIG. 6B, the corners of the light guide device 301 adjacent to the light guide plate 200, such as the first portion 311, can have a microstructure region A1. When the light emitted by the light-emitting diode 110 of the light source 100 enters the light guide device 301, and the light is incident on the microstructure region A1 of the first portion 311 during propagation, the light will travel from the first light emitting surface 331 in different angles, as shown in FIG. 6A.

The microstructure region A1 can be disposed on the side of the first portion 311 that is opposite to the first side 220 of the light guide plate 200. In other words, the side of the first portion 311 of the light guide device 301 facing the light guide plate 200 is the first light emitting surface 331; the side of the first portion opposite to the light guide plate 200 is the microstructure region A1, as shown in FIG. 6A. For the detailed structures of the microstructure region A1, one can refer to FIG. 6B, which shows that the microstructure region A1 includes a concave structure C1 and a convex structure C2. When light is incident on the microstructure region A1 of the first portion 311 while propagating in the light guide device 301, the light will reach the first light emitting surface 331 at different incident angles due to irregular structures such as the concave structure C1 and the convex structure C2. Therefore, the probability that the light is totally reflected on the first light emitting surface 331 and continue to propagate in the light guide device 301 is reduced. In other words, the probability that the light will emit from the first light emitting surface 331 is increased, and the brightness of the corners of the light guide plate 200 is enhanced.

Similarly, the corners of the light guide device 301 adjacent to the light guide plate 200, such as the first portion 311, can have a microstructure region A2. In other words, the side of the second portion 312 of the light guide device 301 facing the light guide plate 200 is the second light emitting surface 332, and the side of the second portion 312 opposite to the light guide plate 200 is the microstructure region A2, as shown in FIG. 6B. When light emitted by the light-emitting diode 110 of the light source 100 enters the light guide device 301, and the light is incident on the microstructure region A2 of the second portion 312 during propagation, the light will travel from the second light emitting surface 332 in different angles, as shown in FIG. 6A. The microstructure region A2 can be disposed on the side of the second portion 312 opposite to the first side 220 of the light guide plate 200. That is, the microstructure region A2 can be disposed on the side of the second portion 312 away from the first side 220 of the light guide plate 200, as shown in FIG. 6A.

For the detailed structures of the microstructure region A2, one can also refer to FIG. 6B, which shows that the microstructure region A2 includes a concave structure C1 and a convex structure C2. When light is incident on the microstructure region A2 of the second portion 312 while propagating in the light guide device 301, the light will reach the second light emitting surface 332 at different incident angles due to irregular structures such as the concave structure C1 and the convex structure C2. Therefore, the probability that light will be totally reflected by the second light emitting surface 332 and continue to propagate in the light guide device 301 is reduced. In other words, the probability that light will be transmitted from the second light emitting surface 332 is increased, and the brightness of the corners of the light guide plate 200 is enhanced. Moreover, the density of the microstructure of the microstructure A2 is higher than the density of the microstructure of the microstructure A1, such that part of the light will propagate to the second portion 312 instead of emitting from the first portion 311. Therefore, the amount of light transmitted from the first portion 311 and the second portion 312 will be balanced.

In the same way, the microstructure regions of the first portion and the second portion of the light guide device on the right side of the light guide plate 200, and the detailed structures of the microstructure are similar to those of the light guide device 301, and they will not be described again here. In addition to using irregular microstructures to hinder total reflection of the light in the light guide device, there are other ways of implementation. As shown in FIG. 6B, a reflection sheet 323 can be disposed on the second portion 312 of the light guide device 301 on the left side of the light guide plate 200. The reflection sheet 323 can prevent light from emitting from positions other than the second light emitting surface 332 of the second portion 312, thereby improving light utilization.

Specifically, the reflection sheet 323 can be disposed on the surface transverse to the extending direction of the light guide device 301. In other words, the reflection sheet 323 can be disposed on the second portion 312 of the light guide device 301 along the X-Z plane perpendicular to the Y axis. When light emitted by the light-emitting diode 110 of the light source 100 enters the light guide device 301 and propagates along the Y-axis direction, the light has the chance to escape from the light guide device 301 along the Y-axis direction. That is, the probability of light transmitting from the second light emitting surface 332 of the second portion 312 of the light guide device 301 to the corner of the light guide plate 200 is reduced. When the reflection sheet 323 is disposed on the second portion 312 of the light guide device 301 along the X-Z plane perpendicular to the Y axis, the light propagating along the Y-axis direction will be reflected back to the inside of the light guide device 301.

Therefore, it will increase the probability of light transmitted from the first light emitting surface 331 and the second light emitting surface 332 reaching the corners of the light guide plate 200, and the technical problem of low brightness at the corners of the light guide plate 200 will be improved. In the same way, a reflection sheet may be disposed on the second portion of the light guide device on the right side of the light guide plate 200 to prevent light from emitting from positions other than the second light emitting surface of the second portion, similar to the implementation for the light guide device 301 on the left side of the light guide plate 200, and it will not describe again here.

Refer to FIG. 7, which is a schematic table showing the simulation results of the illuminance of the corners of the backlight module according to an embodiment of the present invention. As shown in FIG. 7, when the backlight module 10 does not include the light guide device of an embodiment of the present invention, the uniformity of its overall illumination is only 37%. Furthermore, as the control group, when the backlight module 10 does not include the light guide device of an embodiment of the present invention, the relative illumination of the corners of the light guide plate 200 away from the light incident edge 210, such as the distant end 222 and the distant end 232 in FIG. 1 are set to 100%. As the control group, the relative illumination of the corners of the light guide plate 200 away from the light incident edge 210, such as the near end 221 and the near end 231 in FIG. 1 are set to 100%.

Next, as an embodiment of the experimental group, when the backlight module 10 includes the light guide device of an embodiment of the present invention, and the first light emitting surface 331 and the second light emitting surface 332 are inclined planes (the embodiment of FIG. 1B), it can be found that no matter what the width of the light guide device is (conditions 1 to 3 are widths of 1 mm, 2 mm and 3 mm respectively, that is, the widths along the X-axis direction in FIG. 1), the uniformity of the overall illumination is greater than 65%, and the uniformity is obviously improved. Moreover, the relative illumination of the top side (for example, the distant end 222 and the distant end 232) is greater than 150%, and the relative illumination of the bottom side (for example, the near end 221 and the near end 231) is greater than 190%. Therefore, the technical problem of low brightness and uniformity at the corners of the light guide plate 200 of the backlight module 10 is improved.

Figure 8:
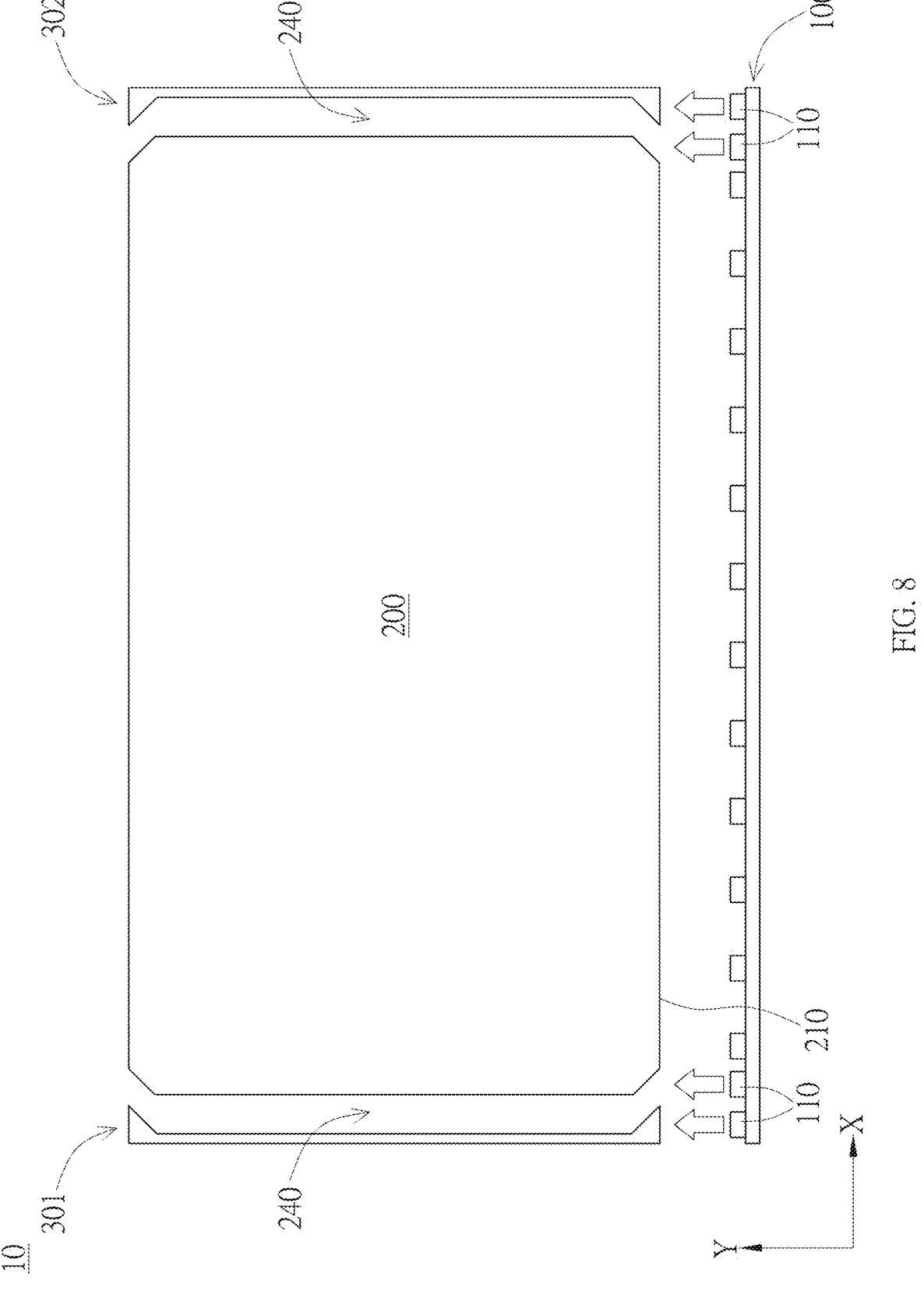
FIG. 8 is a schematic front view of the light source configuration of a backlight module according to an embodiment of the present invention.

In addition, technical problem of low brightness at the corners of the light guide plate 200 of the backlight module 10 can be improved by different configurations of the light source 100. Refer to FIG. 8, which is a schematic front view of the light source configuration of the backlight module according to an embodiment of the present invention. As shown in FIG. 8, the distributing density of the light-emitting diodes 110 of the light source 100 can be adjusted. For example, the light-emitting diodes 110 adjacent to the light guide device 301 are disposed toward the light guide device 301 with higher distributing density. Alternatively, the light-emitting diodes 110 adjacent to the light guide device 302 are disposed toward the light guide device 302 with higher distributing density. Therefore, the light guide device 301 and the light guide device 302 receive more light, and brightness of the corners of the light guide plate 200 are enhanced.

Figure 9:
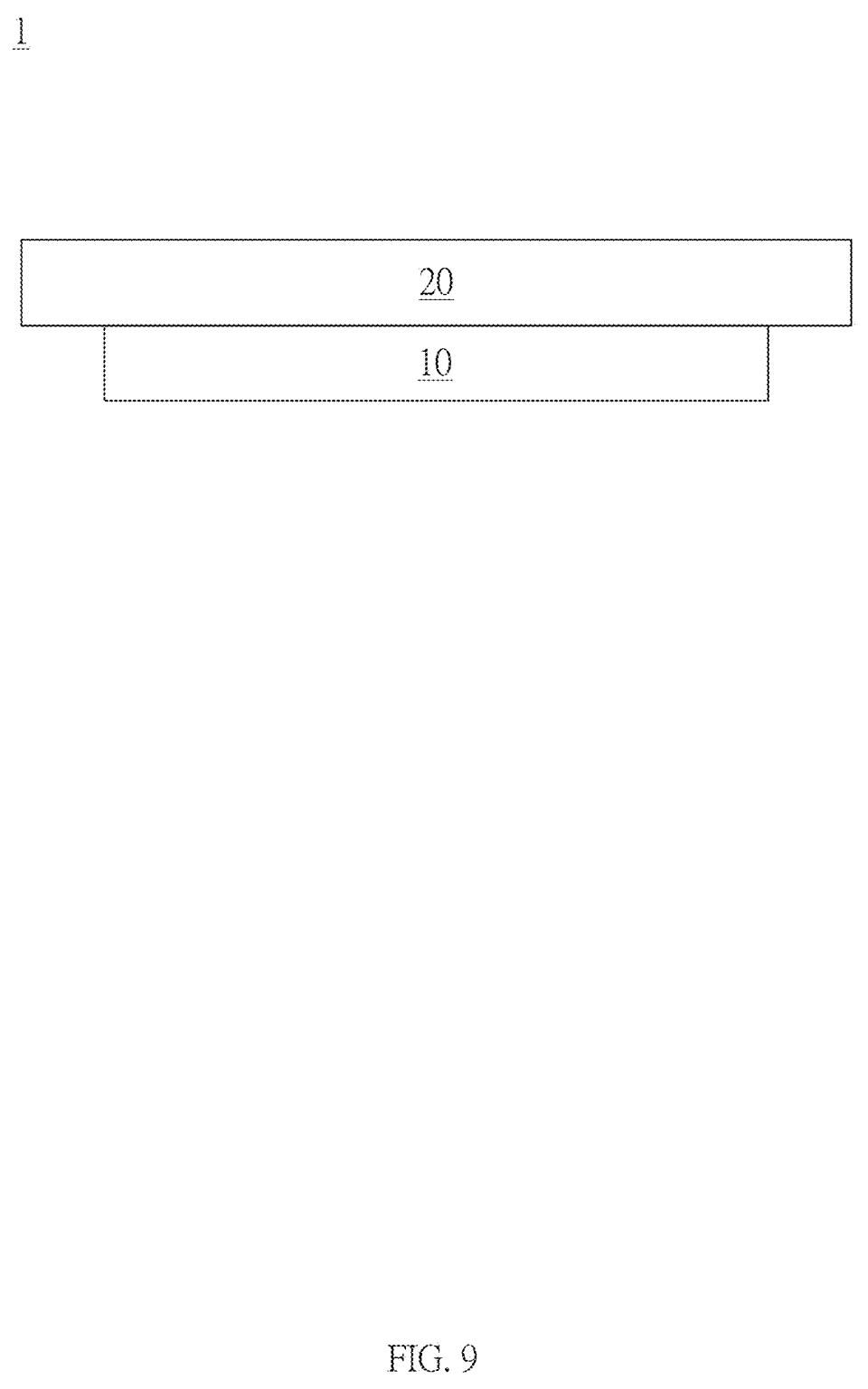

According to an embodiment of the present invention, the aforementioned backlight module 10 can be applied to a display device 1. Refer to FIG. 9, which is a schematic side view of the display device including the backlight module according to an embodiment of the present invention. As shown in FIG. 9, a display panel 20 can be disposed on a light transmitting side of the aforementioned backlight module 10 to obtain an image with uniform brightness.

It should be understood that, although the terms "first", "second" and "third", etc. may be used herein to describe various elements, components, regions, layers and/or portions, these elements, components, regions, layers and/or portions should not be limited by the terms. These terms are only used to distinguish one element, component, region, layer and/or portion from another element, component, region, layer and/or portion. Thus, a "first element", "first component", "first region", "first layer" and/or "first portion" discussed below could be termed a "second element", "second component", "second region", "second layer" and/or "second portion" without departing from the teachings herein.

Although the preferred embodiments of the present invention are described herein, the above descriptions are merely illustrative. The disclosed preferred embodiments will not limit the scope of the present invention. Further modification of the invention herein disclosed may occur to a person having ordinary skill in the art and all such modifications are deemed to be within the scope of the invention as defined by the appended claims.

What is claimed is:

1. A backlight module, comprising:

a light source;

a light guide plate having a light incident edge and a first side, wherein the light incident edge is configured toward the light source and receiving a light from the light source, wherein the first side extends along a direction transverse to the light incident edge from an end of the light incident edge;

an optical film layer disposed on the light guide plate; and a light guide device disposed to extend along the first side, and the light guide device has a first portion and a second portion, wherein the first portion faces toward the light source and receives the light from the light source, wherein the second portion corresponds to a distant end of the first side opposite to the light incident edge and located on a surface of the light guide device opposite to the first portion;

wherein the light guide device at least guides the light incident from the light source to the second portion and the light is emitted and reaches to the distant end of the first side.

2. The backlight module of claim 1, wherein the light source is disposed to extend along the light incident edge and at least partially extend outside the light incident edge and face toward the first portion.

3. The backlight module of claim 2, wherein the light source is a light bar, the light bar comprises a plurality of light-emitting diodes, and an extending direction of the plurality of light-emitting diodes are parallel to the light incident edge, and at least one of the plurality of the light-emitting diodes is configured to face toward the first portion.

4. The backlight module of claim 1, wherein an air layer is disposed between the light guide plate and the light guide device.

5. The backlight module of claim 1, wherein the first portion has a first light emitting surface toward the first side, and one end of the first light emitting surface which is nearer to the light source than another end of the first light emitting surface protrudes toward the light guide plate.

6. The backlight module of claim 5, wherein the first light emitting surface is formed as an incline or a curved surface.

7. The backlight module of claim 5, wherein the first side has a near end connected to the light incident edge, and at least part of the near end matches a shape of the first light emitting surface.

8. The backlight module of claim 5, wherein an average included angle between the first light emitting surface and a virtual surface extended from the first side ranges from 30 degrees to 60 degrees.

9. The backlight module of claim 1, wherein the second portion has a second light emitting surface toward the first side, and one end of the second light emitting surface away from the light source is closer to the light guide plate than another end of the second light emitting surface.

10. The backlight module of claim 9, wherein the second light emitting surface is formed as a slope surface or a curved surface.

11. The backlight module of claim 9, wherein at least portion of the distant end partially matches the shape of the second light emitting surface.

12. The backlight module of claim 9, wherein an average included angle between the second light emitting surface and a virtual surface extended from the first side ranges from 30 degrees to 60 degrees.

13. The backlight module of claim 1, wherein the thickness of the light guide device is less than or equal to the thickness of the light guide plate.

14. A display device, comprising:

the backlight module of claim 1; and a display panel disposed on a light emitting side of the backlight module.

15. A light guide device, comprising:

a body extending along a side of a light guide plate;

a first portion connected to the body, wherein the first portion is disposed toward a light source and receiving a light from the light source, wherein the first portion has a first light emitting surface toward the light guide plate, and one end of the first light emitting surface which is nearer to the light source than another end of the first light emitting surface protrudes toward the light guide plate; and a second portion connected to the body and disposed on a distant end of the body opposite to the first portion;

wherein a light incident to the first portion from the light source emits from the light guide device via the body and the second portion, and the light is incident to the corner of the light guide plate.

* * * * *